Jan. 26, 1971              D. A. JESSUP              3,558,221
PINK-PASS FILTER MEANS FOR CONTINUOUSLY ADJUSTING THE SPECTRAL
CONTENT OF A HEAT RADIATING OBJECT
Filed Nov. 18, 1968                                                    2 Sheets-Sheet 1

INVENTOR.
DONALD A. JESSUP

*H. H. Losche*
Attorney

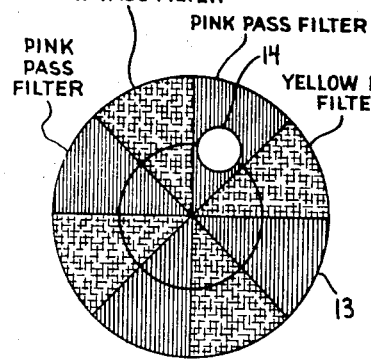
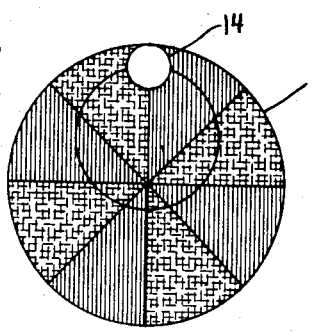
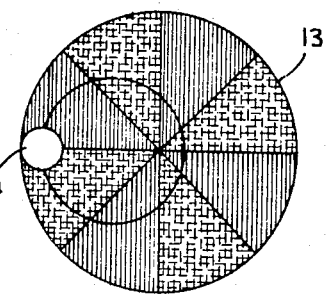
Fig. 3.    Fig. 4.    Fig. 5.
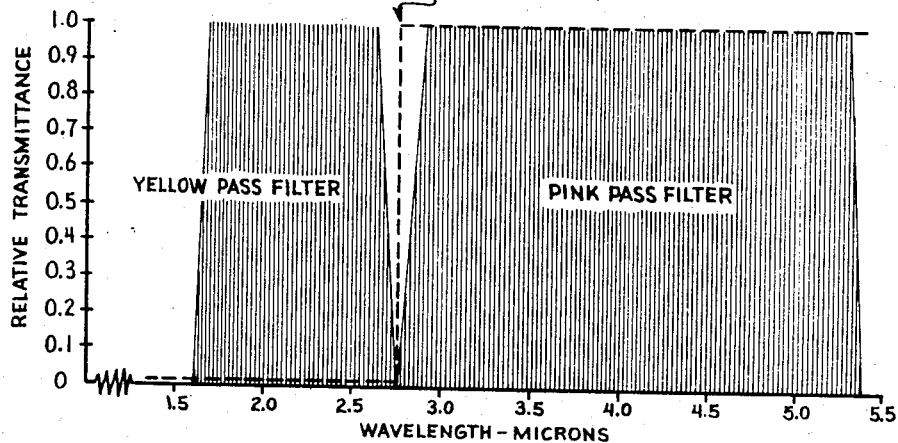
Fig. 6.
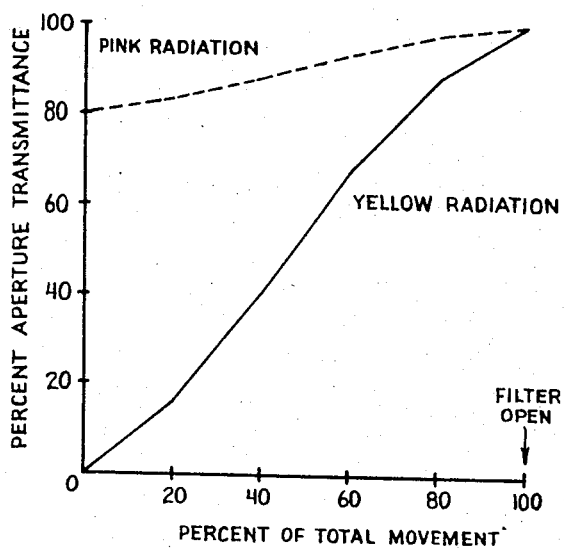
Fig. 7.
INVENTOR
DONALD A. JESSUP

United States Patent Office 3,558,221
Patented Jan. 26, 1971

3,558,221
PINK-PASS FILTER MEANS FOR CONTINUOUSLY ADJUSTING THE SPECTRAL CONTENT OF A HEAT RADIATING OBJECT
Donald A. Jessup, Goleta, Calif., assignor, by mesne assignments, to the United States of America as represented by the Secretary of the Navy
Filed Nov. 18, 1968, Ser. No. 779,305
Int. Cl. G02b 5/22
U.S. Cl. 350—315         6 Claims

ABSTRACT OF THE DISCLOSURE

A variable aperture filter having a pair of pink-pass filters mechanically supported on a means to be adjustably controlled to advance and retract the filters over the aperture in a light path of infrared radiation to adjustably control the balance of yellow and pink radiation from an infrared target radiation source to suppress or minimize background and reflected radiation and pass pink target radiation.

BACKGROUND OF THE INVENTION

This invention relates to infrared target radiation seeker systems and more particularly to the filter system therefor to adjust the spectral content of an image radiating infrared rays.

The performance of infrared detection and tracking equipment operating in an atmospheric environment is often limited by the existence of background which either radiate infrared energy or reflect sunlight. The use of reticles and filters provides a reduction in the background effects by providing spatial and spectral discrimination for a given target of a known geometrical shape and spectral radiance. A reduction in this background interference is often obtained in prior known devices by the two-color technique which provides discrimination by using the difference between the spectral distribution of energy from the target and the spectral distribution of the background. For example, a sunlit cloud has a distribution that approximates a black body of a temperature 5,600° K. (Kelvin) while a jet aircraft tail pipe has a distribution that approximates a black body at 500° K. Thus, the energy in a narrow spectral region centered at 2 microns is 11.5 times that in a region of the same width centered at 4 microns for the 5,600° K. case, but only 0.0285 times as great in the 500° K. case. By using two detectors, one sensitive in each of two regions, it is possible to balance the electrical outputs in the 5,600° K. case and have essentially no effect on the 500° K. radiation at this balance point. Another known prior art means is to use a single detector and to chop the target energy by a reticle which alternately transmits energy in two spectral regions. By choosing the transmission in each of the regions correctly, backgrounds of a given temperature will not be chopped due to their energy output being equal in the two regions. In these known means, correction against very intense sunlit background is practical but varying factors, such as atmospheric constituents, sun angle, range and other variables, modify the spectral radiant intensity of the background and cause deterioration of target detection effectiveness.

SUMMARY OF THE INVENTION

In the present invention the continually changing background temperatures may be continuously balanced out by an adaptive two-color rejection technique using a single infrared detector. In this invention an infrared detection system has a two-color reticle filter in the optical path of the detector optical system and a scanner for the detector scans in a circular manner over the reticle. The invention comprises placing a variable aperture filter in the front aperture of the optical system. The variable aperture filter consists of a support for two pink-pass filters that are actuatable to advance toward and retract from each other across an annular aperture in the front aperture of the entering radiation. The actuator may consist of a reversely threaded shaft having a pair of followers, each follower being fastened to a pink filter to cause advancement or retraction of the filters upon rotation of the threaded shaft. Other mechanical means of advancing (closing) and retracting (opening) the filters over the aperture may be accomplished by pneumatic or hydraulic cylinders, electric motors, chains, cables, etc. Since only two colors are passed by the reticle, the closer the pink-pass filters are brought together the less yellow aperture remains but the pink aperture remains open. When the filter pair closes, the yellow transmission through the aperture becomes substantially zero and pink transmission is unrestricted. Accordingly, it is a general object of this invention to provide a variable aperture filter that is adjustable to balance the yellow and pink light energy by reducing the yellow light energy aperture without reducing the pink light energy aperture.

BRIEF DESCRIPTION OF THE DRAWINGS

These and other objects and the attendant advantages, features, and uses will become more apparent to those skilled in the art as a more detailed description proceeds when taken along with the accompanying drawings, in which:

FIGS. 3, 4 and 5, illustrate a sectioned pink-pass and yellow-pass filter reticle, FIG. 3 showing the boresight condition, FIG. 4 showing an elevation error condition, and FIG. 5 showing an azimuth error condition;

FIG. 6 illustrates the spectral transmission characteristics of reticle sections and aperture filter; and FIG. 7 is a graph representation of the computed aperture transmission characteristics as the variable filter aperture is opened.

DESCRIPTION OF THE PREFERRED EMBODIMENT

Figure 1:
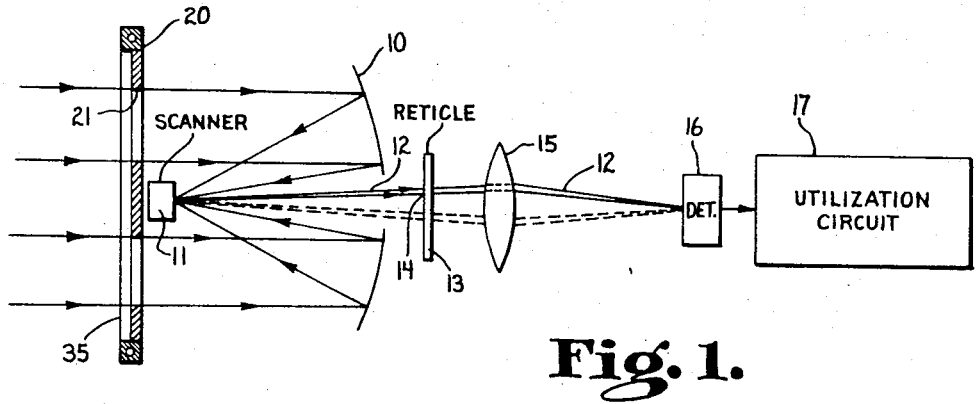
FIG. 1 is an illustration of an infrared radiation seeker system.

Referring more particularly to FIG. 1, with occasional reference to FIGS. 3, 4, and 5, illustrating a light radiation detector system, incoming parallel rays are reflected on a curved mirror surface 10 to a scanner 11 of the type that rotates a reflecting surface slightly off the normal angle to produce reflected rays therefrom in a circular pattern, as shown by the rays 12. These rays are directed through a reticle 13 and through the center of the mirror 10, which provides a cassegrainian type of reflecting system. The reticle 13 is constructed as shown in FIGS. 3, 4 and 5, in which eight sections or sectors of the circular reticle are provided with alternate sectors being pink-pass filter sections and yellow-pass filter sections. When the incoming rays are on boresight of the detector system, as shown in FIG. 1, the scan through the reticle 13 will be as shown in FIG. 3 thereby producing a small scan circle 14 over one face of the reticle 13. This ray bundle 12 passes through the reticle filter 13 and through an objective condenser lens 15 to cause the ray bundle to impinge on a detector 16. The detector 16 output is to a utilization circuit 17, as where the detector detects infrared radiation, and the utilization circuit is used to produce instrument or cathode ray tube display of an infrared target. If the incoming rays are off boresight in any direction to produce a scan off boresight, as shown in FIGS. 4 and 5, the beam 12 striking the detector 16 will be frequently modulated and this detected amount in the utilization circuit will be utilized for detecting azimuthal and elevational correction to bring the target on boresight. Since the means for correcting boresight errors forms no part of this invention, no further description will be provided therefor.

In the area of the front aperture is placed a variable aperture control means 20 having an annular aperture opening 21 to allow incoming rays to pass through and reflect on the annular or cassegrainian mirror surface 10. The variable aperture device has pink-pass filter panels that may be extended across, or withdrawn from, the annular aperture 21 as more particularly shown and described for FIG. 2.

Figure 2:
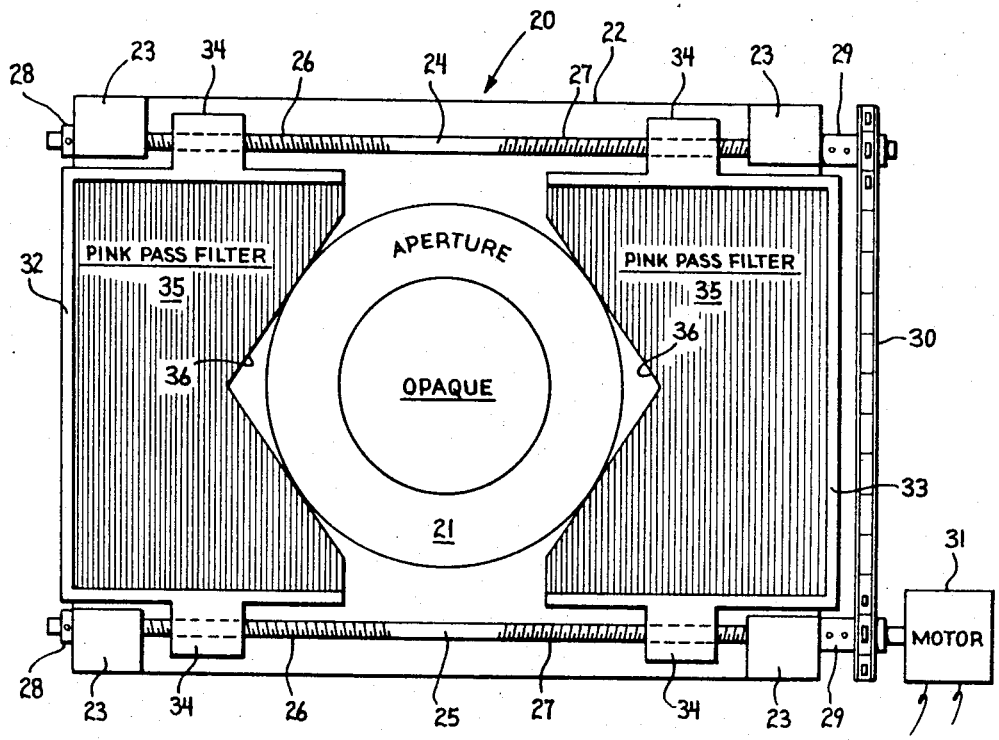
FIG. 2 is a front elevational view of the variable aperture means of this invention.

Referring more particularly to FIG. 2, the variable aperture filter device 20 has a principal supporting opaque sheet 22 with an annular transparent opening 21 therein. On this sheet 22 are four blocks 23 having threaded openings therein in alignment to support two threaded rods 24 and 25. Each rod 24 and 25 has oppositely threaded portions 26 and 27 thereon with each end journaled in the blocks 23. Each shaft 24 and 25 has a collar 28 on one end and a sprocket wheel 29 on the opposite end with a chain 30 running over the sprocket wheels 29. One of the shafts, 24 or 25, is driven in rotation by any desirable power means, such as by hand crank, herein shown to be an electric motor 31. Two frame members 32 and 33 have lugs 34 on top and bottom thereof with threaded openings therein matching the threads of the threaded shaft which passes through the threaded openings of the lugs 34. Within each frame 32 is a panel of pink-pass filter material 35. The adjacent edges of the pink-pass filter panels 35 are cut out in a V formation, as shown by 36, to produce a four-sided closure member over the annular aperture 21. As may be realized from FIG. 2, as the motor 31 drives the shaft 25 in one rotative direction, shaft 24 will likewise be similarly driven through the chain 30 and cause the pink-pass filter panels to advance toward each other, thus passing over and ultimately closing off the annular aperture 21 to all but pink radiation. When the motor 31 rotates in the opposite rotative direction, it will cause the pink-pass filter panels to retract from each other and open the annular aperture 21 to all radiation. Accordingly, the annular aperture 21 can be varied to vary yellow transmission in accordance with the degree of closing or opening of the pink-pass filter panels 35 over the annular aperture.

It is to be understood that although the pink-pass filter panels 35 are shown driven by double ended, oppositely threaded shaft means, other means of advancement and retraction of the filter members 35 can be used, such as pneumatic motors, hydraulic motors, chains, cables, etc., as well understood by those skilled in the art. In like manner the motor 31 herein shown as being electric could be another motive means type to rotate one of the shafts 24 or 25.

OPERATION

Referring more particularly to FIGS. 1 and 2, it should be readily realized that whenever the infrared target seeker means of FIG. 1 is directed toward an infrared radiating target, this radiation will appear as shown by the incoming light arrows in FIG. 1 to be reflected on the mirror 10 and scanned by the scanner means 11 to project this radiation through the reticle 13 and objective lens 15 to the detector means 16. Any target appearing off boresight will be corrected by reason of the frequency modulation of the light rays 12 through the reticle 13 and utilized in the utilization circuit to place the target on boresight, as shown by the condition of FIG. 3 of the drawings. Since infrared radiation is in the pink part of the spectrum, as shown in FIG. 6, being about 2.5 to 5.5 microns, it is desirable to pass pink radiation because the target will be in this wavelength of the light entering by the incoming rays. Radiation from the sun reflected on clouds, water, or other reflecting surfaces will also be in the incoming rays of light and will constitute a greater part of the yellow spectrum of light falling within 1.5 to 2.5 microns, as shown in FIG. 6. Since much of this reflected sunlight radiation can be eliminated by a pink-pass filter, the pink-pass filter aperture device 20 is adjusted to block yellow radiation and pass pink radiation in a balanced manner, which will include a target object radiating infrared rays. The radiation passing the variable aperture 20 is reflected from the surfaces 10 and 11 through the reticle 13, having both pink-pass and yellow-pass filter sections, through the objective lens 15 to the detector 16. The greatest target detections of infrared radiation will be observed in the utilization circuit 17 when there is proper balance between the pink radiation and yellow radiation of light in the incoming light to the infrared seeker system. This balance can be accomplished by the variable aperture device 20 as shown in FIG. 2 and used in the front aperture of the system, as shown in FIG. 1. The fundamental limitation was that changing atmospheric conditions resulted in the background radiation not containing equal amounts of radiation in the two spectral regions of pink and yellow. The present invention makes it possible to equalize these radiations by control of the annular aperture 21 by varying the degree of closure over the aperture 21 with the pink-pass filter panels 35. In this manner balancing the yellow and pink radiation impinging on the detector can be maintained. The filter passbands selected on the basis of target spectral energy distribution and maximum balance under varying atmospheric conditions are shown in FIG. 6.

FIG. 7 shows in graph form computed aperture transmission characteristics as the variable filter aperture 21 is opened from complete closure, where the panels 35 abut over the aperture 21, to a full open position as shown in FIG. 2. FIG. 7 also shows the percentage of radiation relative to the percentage of total movement of the pink-pass filter panels 35.

While many modifications and changes may be made in the constructional details and features of this invention, it is to be understood that I desire to be limited in the scope of my invention only by the limitations of the following claims.

I claim:

1. A means for continuously adjusting the spectral content of a heat radiating object comprising:
an opaque wall with a transparent opening therein adapted to be placed in the optical path of an infrared detector system;
a pair of pink-pass filters;
first means supported on said wall and supporting said pink-pass filters with actuating means to variably control the advancement and retraction of said pink-pass filters toward and away from each other over said opening; and
second means coupled to said actuating means to operate said actuating means whereby said last-mentioned means is operated to actuate said actuating means to vary and close off yellow radiated energy through said opening without varying the passage of said pink radiated energy to maintain yellow and pink radiated energy balance to identify pink target object radiations.

2. A means as set forth in claim 1 wherein:
said pair of pink-pass filters has the adjacent edges thereof each with a cutout V-portion therein to produce a four-sided advance of the filters over said opening.

3. A means as set forth in claim 2 wherein:
said first means comprises a pair of frames, one for each pink-pass filter, each frame having at least one threaded opening parallel with the plane of the filter and supported on at least one threaded shaft of oppositely pitched threads on opposite halves of the threaded shaft to cause said pair of frames to travel toward each other for one direction of rotation of said threaded shaft and to travel apart for the other direction of rotation of said threaded shaft.

4. A means as set forth in claim 3 wherein:
said pair of filter frames each has a threaded opening on opposite ends and a threaded shaft threadedly engaged in each threaded opening, each threaded shaft having oppositely pitched threads on opposite shaft halves, and said shafts being mechanically linked to rotate together to cause said pair of frames to travel toward each other for one direction of said commonly linked shafts and to travel apart for the other direction of rotation of said commonly linked shafts.

5. A means as set forth in claim 4 wherein:
said opening in said opaque wall is an annular opening.

6. A means as set forth in claim 5 wherein:
said second means is a reversible power motive means coupled to one of said shafts.

References Cited
UNITED STATES PATENTS

| | | | |
|---|---|---|---|
| 3,180,991 | 4/1965 | Dixon | 250—83.3 |
| 3,493,748 | 2/1970 | Tajima | 350—315 |

RICHARD A. FARLEY, Primary Examiner

WILLIAM T. RIFKIN, Assistant Examiner

U.S. Cl. X.R.

250—83.3; 350—317